(12) United States Patent
Raffy

(10) Patent No.: US 9,056,796 B2
(45) Date of Patent: Jun. 16, 2015

(54) ATZ FUSED GRAINS

(75) Inventor: Stephane Raffy, Les Vigneres (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 19 days.

(21) Appl. No.: 14/006,824

(22) PCT Filed: Mar. 27, 2012

(86) PCT No.: PCT/IB2012/051461
§ 371 (c)(1),
(2), (4) Date: Sep. 23, 2013

(87) PCT Pub. No.: WO2012/131582
PCT Pub. Date: Oct. 4, 2012

(65) Prior Publication Data
US 2014/0011660 A1 Jan. 9, 2014

(30) Foreign Application Priority Data
Mar. 31, 2011 (FR) ....................... 11 52725

(51) Int. Cl.
*C04B 35/109* (2006.01)
*C04B 35/46* (2006.01)
*C04B 35/478* (2006.01)
*C04B 35/484* (2006.01)
*C04B 35/49* (2006.01)
*C04B 35/626* (2006.01)
*C04B 35/657* (2006.01)

(52) U.S. Cl.
CPC ............... *C04B 35/46* (2013.01); *C04B 35/109* (2013.01); *C04B 35/478* (2013.01); *C04B 35/484* (2013.01); *C04B 35/49* (2013.01); *C04B 35/62665* (2013.01); *C04B 35/657* (2013.01); *C04B 2235/3201* (2013.01); *C04B 2235/3206* (2013.01); *C04B 2235/3208* (2013.01); *C04B 2235/3217* (2013.01); *C04B 2235/3225* (2013.01); *C04B 2235/3227* (2013.01); *C04B 2235/3232* (2013.01); *C04B 2235/3234* (2013.01); *C04B 2235/3241* (2013.01); *C04B 2235/3244* (2013.01); *C04B 2235/3249* (2013.01); *C04B 2235/3262* (2013.01); *C04B 2235/3272* (2013.01); *C04B 2235/3286* (2013.01); *C04B 2235/3418* (2013.01); *C04B 2235/3427* (2013.01); *C04B 2235/5427* (2013.01); *C04B 2235/5436* (2013.01); *C04B 2235/72* (2013.01); *C04B 2235/77* (2013.01); *C04B 2235/80* (2013.01); *C04B 2235/96* (2013.01); *C04B 2235/9607* (2013.01)

(58) Field of Classification Search
CPC ........................... C04B 35/109; C04B 35/484
USPC .................................................... 501/105, 107
See application file for complete search history.

(56) References Cited

U.S. PATENT DOCUMENTS

| | | | | |
|---|---|---|---|---|
| 2,905,564 | A * | 9/1959 | Roup et al. | 501/104 |
| 4,646,950 | A | 3/1987 | Gotoh et al. | |
| 7,405,173 | B2 * | 7/2008 | Marlin et al. | 501/105 |
| 7,713,897 | B2 * | 5/2010 | Ogunwumi et al. | 501/134 |
| 8,901,022 | B2 * | 12/2014 | Francy et al. | 501/127 |
| 2007/0197369 | A1 | 8/2007 | Marlin et al. | |
| 2008/0203627 | A1 | 8/2008 | Ogunwumi et al. | |
| 2011/0105318 | A1 | 5/2011 | Raffy | |
| 2012/0309608 | A1 * | 12/2012 | Francy et al. | 501/89 |

FOREIGN PATENT DOCUMENTS

| | | |
|---|---|---|
| EP | 1 820 785 A1 | 8/2007 |
| KR | 2003-0090081 | 11/2003 |
| WO | WO 2010/001065 A2 | 1/2010 |

OTHER PUBLICATIONS

Wang et al., "Preparation and Performance of A $l_2TiO_5$—$ZrO_2$ Multiphase Material," *Materials Engineering*, 2005, pp. 38-41, No. 5 (with abstract).
Office Action issued in Chinese Patent Application No. 20128001517.4 dated Jun. 16, 2014 (with partial translation).
International Search Report issued in International Patent Application No. PCT/IB2012/051461 dated Jun. 15, 2012 (w/translation).
Written Opinion of the International Searching Authority issued in International Patent Application No. PCT/IB2012/051461 dated Jun. 15, 2012 (w/translation).

* cited by examiner

Primary Examiner — Karl Group
(74) Attorney, Agent, or Firm — Oliff PLC

(57) ABSTRACT

Fused grain having the following chemical composition: more than 10% and less than 50% of alumina $Al_2O_3$; more than 10% and less than 50% of titanium oxide $TiO_2$; more than 21% and less than 50% of zirconia; more than 1% and less than 10% of a compound chosen from the group constituted by MgO, CaO, $Fe_2O_3$, $Cr_2O_3$, $MnO_2$, $La_2O_3$, $Y_2O_3$, $Ga_2O_3$ and mixtures thereof; less than 20% of silica $SiO_2$; less than 10% of a compound chosen from the group constituted by alkali metal oxides, alkaline-earth metal oxides and mixtures thereof; less than 2% of other oxide species; the percentages being percentages by weight on the basis of the oxides. Application in the melting of metals.

14 Claims, No Drawings

ATZ FUSED GRAINS

TECHNICAL FIELD

The invention relates to fused grains based on alumina, titanium oxide and zirconia, to a process for manufacturing such grains, to a sintered product comprising such grains, and to an application in which such a sintered product is intended to come into contact with a molten metal.

PRIOR ART

In order to be able to be used in such an application, a ceramic sintered product must have a good mechanical strength, a good resistance to thermal shocks and a good corrosion resistance in contact with the molten metal. The choice of the grains used for manufacturing the product is, to that end, a determining factor.

A slide gate is in particular used in the continuous casting of steel in order to open or close tundishes or discharge orifices of ladles in fluid communication with ingot molds, via a continuous casting nozzle or sliding nozzle.

Conventionally, the slide gates are obtained by sintering a mixture of corundum and of fused zirconia-mullite grains and optionally fused alumina-zirconia grains.

EP 1 820 785 describes a slide gate manufactured by sintering a mixture comprising fused grains having between 10% and 50% of alumina $Al_2O_3$, between 10% and 40% of $TiO_2$ and more than 50% of zirconia, as weight percentages.

There is a constant need for novel grains capable of being used in sintered products that are intended to be in contact with a molten metal, in particular in slide gates and that have improved mechanical properties and also a good resistance to thermal shocks. One objective of the invention is to meet this need.

SUMMARY OF THE INVENTION

According to the invention, this objective is achieved by means of a molten grain comprising, for a total of 100%:
- more than 10%, preferably more than 15%, and less than 50%, preferably less than 35% of alumina $Al_2O_3$;
- more than 10%, preferably more than 15%, and less than 50%, or less than 45%, or less than 40%, or less than 35% of titanium oxide $TiO_2$;
- more than 21%, preferably more than 25%, and less than 50% and, preferably, less than 45% of zirconia ($ZrO_2$ + traces of $HfO_2$);
- more than 1%, preferably more than 1.5%, preferably more than 2%, preferably more than 2.5% and less than 10%, less than 9%, preferably less than 8% of a compound selected from the group consisting of MgO, CaO, $Fe_2O_3$, $Cr_2O_3$, $MnO_2$, $La_2O_3$, $Y_2O_3$, $Ga_2O_3$ and mixtures thereof;
- less than 20% of silica $SiO_2$;
- less than 10%, preferably less than 5%, less than 4%, or less than 3% of a compound selected from the group consisting of alkali metal oxides, alkaline-earth metal oxides and mixtures thereof, and in particular selected from the group consisting of the oxides of the elements Sr, Na, K and Ba, and mixtures thereof;
- less than 2% of other oxide species;
the percentages being percentages by weight on the basis of the oxides.

A fused grain according to the invention may also have one or more of the following features:
- The weight content of MgO is greater than 1%, preferably greater than 1.5% and/or less than 9% and, preferably, less than 8%.
- The weight content of CaO is greater than 0.5%, or greater than 0.7%, greater than 1%, greater than 1.5%, and/or less than 9%, or less than 8%, or less than 5%, or less than 3%.
- The weight content of $Y_2O_3$ is greater than 0.5%, or greater than 0.7%, greater than 1%, greater than 1.5%, and/or less than 8%, or less than 5%, or less than 3%.
- MgO, CaO and $Y_2O_3$ are present at the same time.
- The content of ($Cr_2O_3+MnO_2+La_2O_3+Ga_2O_3$) is less than 1%, or less than 0.5%.
- The compounds belonging to the group of oxides, nitrides, oxynitrides, carbides, oxycarbides, carbonitrides and metallic species of iron, vanadium and chromium are impurities.
- The content of each of said alkali metal oxides and/or alkaline-earth metal oxides is less than 4%, or less than 3%, or less than 1%.
- The compounds belonging to the group of oxides, nitrides, oxynitrides, carbides, oxycarbides, carbonitrides and metallic species of sodium and other alkali metals are impurities.
- The content of silica is greater than 0.1%, greater than 1%, greater than 2%, and/or less than 18%, less than 15%, less than 12%, less than 10%.

The invention also relates to a powder comprising, or even consisting of, grains according to the invention and the use of such a powder for the manufacture of a slide gate or of a lining of a furnace, for example an induction furnace, in particular for melting metals. The powder may in particular be of the dry ramming mix or "DVC", dry vibratable mix or dry refractory, type.

A powder of grains according to the invention may have a median diameter ($d_{50}$) of greater than 2 µm, greater than 5 µm, or greater than 10 µmm or greater than 50 µm and/or less than 8 mm, less than 7 mm, less than 5 mm, less than 3 mm, less than 2 mm, less than 1 mm, or less than 500 µm.

The invention also relates to a sintered product obtained by sintering a powder according to the invention or a mixture of powders comprising at least one powder according to the invention having different median sizes, in particular in the form of a lining or a slide gate.

Preferably, a sintered product according to the invention has an open porosity of less than 30%, less than 20%, or less than 15%.

The invention also relates to a process for manufacturing a powder of fused grains according to the invention, comprising the following successive steps:
a) mixing of raw materials so as to form a feedstock,
b) melting of said feedstock until a molten material is obtained,
c) solidifying said molten material,
d) optionally, and in particular if step c) does not result in grains being obtained, milling said solid mass so as to obtain a powder of grains.

According to the invention, the raw materials are chosen in step a) so that the solid mass obtained at the end of step c) has a composition in accordance with that of a grain according to the invention.

The invention finally relates to the use of a sintered product according to the invention or obtained according to a process in accordance with the invention, in an application in which it is subjected to a thermal shock and/or in which it is in contact with a molten metal, in particular in the form of a lining or a slide gate. In particular, it relates to an installation chosen from a furnace and a slide gate comprising a sintered product obtained by sintering a powder of grains according to the invention, in particular in a region where said sintered product is intended to be in contact with a molten metal.

DEFINITIONS

In the present description and claims, unless otherwise mentioned, all the percentages are weight percentages. In particular, all the compositions of a grain are given as weight percentages on the basis of the oxides of the grain.

A "molten material" is a liquid mass which, in order to retain its shape, must be kept in a container. It may contain a few solid particles, but in an insufficient amount for them to be able to structure said mass.

"Other oxide species" denotes all the oxide compounds that are not mentioned elsewhere, i.e. other than $Al_2O_3$, $TiO_2$, $ZrO_2$, $HfO_2$, $MgO$, $CaO$, $Fe_2O_3$, $Cr_2O_3$, $MnO_2$, $La_2O_3$, $Y_2O_3$, $Ga_2O_3$, $SiO_2$ and the alkali metal oxides and/or alkaline-earth metal oxides.

The term "impurities" is understood to mean the inevitable constituents, unintentionally introduced with the raw materials or resulting from reactions with these constituents. The impurities are not necessary constituents but merely constituents that are tolerated.

The term "zirconia" refers to zirconium oxide $ZrO_2$ and the traces of hafnium oxide $HfO_2$, not chemically separable from $ZrO_2$ and always naturally present in sources of $ZrO_2$. These traces of $HfO_2$ represent less than 2% of the weight of the zirconia. Hafnium oxide is neither considered to be an impurity, nor to be an "other oxide species".

The expression "median diameter" of a powder of grains, generally denoted by $d_{50}$, refers to the diameter that divides the grains of this powder into first and second populations that are equal in volume, these first and second populations comprising only grains that have a diameter greater than, or respectively less than, the median diameter. The expression "diameter of the grain" is understood to mean the diameter of the sphere of the same volume. The diameter of the grains of a powder is conventionally evaluated by a characterization of the particle size distribution carried out with a laser particle size analyzer. The laser particle size analyzer may be, for example, a Partica LA-950 from the company HORIBA.

The term "grain" refers to a particle having a diameter of less than 10 mm

DETAILED DESCRIPTION

The description that follows is provided for illustrative purposes and does not limit the invention. Fused grains according to the invention may be manufactured according to the aforementioned steps a) to d).

In step a), raw materials are conventionally measured out so as to obtain the desired composition, then mixed in order to form the feedstock.

Titanium may be introduced in any form, in particular in the form of an oxide $TiO_2$ or in metallic form or in the form of a zirconia-titanium oxide alloy, or of alumina titanate.

In one embodiment, the alkali metal oxides and alkaline-earth metal oxides are impurities.

It is considered that a content of "other oxide species" of less than 2% does not suppress the technical effect provided by the invention. The "other oxide species" may also be impurities.

Preferably, the content of impurities is less than 3%, less than 2%, less than 1%, or less than 0.5%.

In step b), use is preferably made of an electric arc furnace, but all known furnaces can be envisaged, such as an induction furnace or a plasma furnace, provided that they make it possible to completely melt the feedstock. The firing is preferably carried out under neutral conditions, for example under argon, or oxidizing conditions, preferably at atmospheric pressure.

In step c), the cooling may be rapid, i.e. so that the molten material is completely solidified in less than 3 minutes. For example, it may result from a casting into CS molds as described in U.S. Pat. No. 3,993,119 or from a quenching. It may also be slow (ingot cooled in the open air or annealing block).

If step c) does not make it possible to obtain a powder of grains, or if these grains do not have a suitable particle size for the intended application, milling (step d)) may be carried out, according to conventional techniques.

The manufacture of a sintered product according to the invention, from a powder of grains according to the invention, may be carried out by any known process.

EXAMPLES

The following examples are provided by way of illustration and do not limit the scope of the invention.

In all the examples, the samples were prepared from the following raw materials:

anatase comprising more than 98% of $TiO_2$, sold by the company Altichem or rutile comprising more than 95% of $TiO_2$ and having a median diameter $d_{50}$ of around 120 μm, sold by the company Europe Minerals, alumine AR75 comprising more than 98% of $Al_2O_3$, sold by the company Alcan and having a median diameter $d_{50}$ of around 85 μm, silica $SiO_2$ with a degree of purity of greater than 99.5% and having a median diameter $d_{50}$ of 208 μm, sold by the company Sifraco, magnesia $MgO$ with a degree of purity of greater than 98%, more than 80% of the particles having a diameter between 0.25 and 1 mm, sold by the company Nedmag, zirconia with a degree of purity of greater than 98.5% and having a median diameter $d_{50}$ of 3.5 μm, sold under the reference CC10 by the company Saint-Gobain ZirPro.

The raw materials were measured out and mixed in order to form a feedstock of appropriate composition.

For the manufacture of the sample of example 3, the feedstock was pressed in order to form a preform in the form of a disk having a diameter of 13 mm and a height of 13 mm.

For the manufacture of the samples of examples 1, 2 and 4, the feedstock was melted in an electric arc furnace, in air, under oxidizing electrical conditions, then cooled. The solid masses obtained were then milled and screened in order to obtain powders having a median diameter ($d_{50}$) between 10 and 15 μm.

The powders of fused grains were pressed in order to form preforms in the form of disks, similar to that of example 3.

All of the disks were then sintered at a temperature of 1450° C. for 4 hours. The samples of examples 1 to 4 were thus obtained.

The samples prepared were then analyzed. The results are assembled in table 1.

The chemical composition, indicated as weight percentages on the basis of the oxides, was determined by X-ray fluorescence.

The porosity (P) was determined conventionally by measuring the geometric density and absolute density determined, on the milled sample, by helium pycnometry.

The expansion coefficient "a" was measured between 50° C. and 600° C.

The compressive strength "b" was determined at ambient temperature, in a conventional manner, on samples 1 to 4.

TABLE 1

| | Grains | Chemical composition (as weight percentages) | | | | | | Results | | |
|---|---|---|---|---|---|---|---|---|---|---|
| | | $Al_2O_3$ | $TiO_2$ | $ZrO_2$ | MgO | $SiO_2$ | $Fe_2O_3$ | P (%) | a (° C.$^{-1}$) | b (MPa) |
| 1* | Fused | 42.0 | 44.0 | 4.55 | 4.25 | 4.61 | 0.54 | 16 | $0.7 \times 10^{-6}$ | 180 |
| 2 | Fused | 28.1 | 32.6 | 31.2 | 3.07 | 4.20 | 0.38 | 10 | $4.7 \times 10^{-6}$ | 345 |
| 3* | | 28.1 | 32.6 | 31.2 | 3.07 | 4.20 | 0.38 | 28 | ND | 23 |
| 4* | Fused | 17.9 | 22.2 | 56.7 | 2.31 | 0.57 | 0.30 | 21 | $7.1 \times 10^{-6}$ | 204 |

*comparative example

Table 1 indicates that the grains according to the invention (example 2) result in a sintered product that has a particularly high mechanical strength.

The comparison of example 2 and example 3 shows the advantage of grains obtained by melting, referred to as "fused" grains. This is because the melting of the feedstock results in a better mechanical strength and a lower porosity, making it possible to limit the corrosion and/or the infiltration.

Table 1 shows that the grains according to invention have an expansion coefficient "a" that is lower than that of example 4* or than that of fused mullite-zirconia grains (of the order of $7 \times 10^{-6\circ}$ C.$^{-1}$) or than that of fused alumina-zirconia grains (of the order of $10 \times 10^{-6\circ}$ C.$^{-1}$). This makes it possible to obtain products having a better resistance to thermal shocks.

The crystalline phases present in the sample of example 2 were characterized by X-ray diffraction. A main phase is observed consisting of an oxide phase in solid solution, of pseudo-brookite type, comprising titanium, aluminum, magnesium and zirconium in proportions such that the pseudo-brookite type phase corresponds substantially to the formulation $(Al_2TiO_5)_x(MgTi_2O_5)_y(MgTiZrO_5)_z$, with $0.1 \leq x < 1$ and $0 < y \leq 0.9$ and $z = 1-x-y$. Also observed is a silicate phase and another phase essentially consisting of titanium oxide and zirconia.

Furthermore, the stability of the crystalline phases present was verified by a test consisting in comparing, by X-ray diffraction, the crystalline phases initially present in the sample of example 2 to those present in this same sample after a heat treatment of 100 hours at 800° C.

As is now clearly apparent, the invention provides a grain suitable for being effectively used in a sintered product intended to be in contact with a molten metal.

Of course, the invention is not limited to the embodiments of the examples, provided for illustrative purposes.

The invention claimed is:

1. A fused grain having the following chemical composition, for a total of 100%:
   more than 10% and less than 50% of alumina $Al_2O_3$;
   more than 10% and less than 50% of titanium oxide $TiO_2$;
   more than 21% and less than 50% of zirconia;
   more than 1% and less than 10% of a compound selected from the group consisting of MgO, CaO, $Fe_2O_3$, $Cr_2O_3$, $MnO_2$, $La_2O_3$, $Y_2O_3$, $Ga_2O_3$ and mixtures thereof;
   less than 20% of silica $SiO_2$;
   less than 10% of a compound selected from the group consisting of the oxides of the elements Sr, Na, K and Ba, and mixtures thereof;
   less than 2% of other oxide species;
   the percentages being percentages by weight on the basis of the oxides.

2. The fused grain as claimed in claim 1, comprising:
   more than 15% of alumina $Al_2O_3$; and/or
   more than 15% of titanium oxide $TiO_2$; and/or
   more than 25% of zirconia;
   more than 1.5% of a compound selected from the group consisting of MgO, CaO, $Fe_2O_3$, $Cr_2O_3$, $MnO_2$, $La_2O_3$, $Y_2O_3$, $Ga_2O_3$ and mixtures thereof; and/or
   less than 5% of a compound selected from the group consisting of the oxides of the elements Sr, Na, K and Ba, and mixtures thereof;
   as weight percentages on the basis of the oxides.

3. The fused grain as claimed in claim 1, comprising:
   less than 35% of alumina $Al_2O_3$; and/or
   less than 45% of titanium oxide $TiO_2$; and/or
   less than 45% of zirconia; and/or
   less than 9% of a compound selected from the group consisting of MgO, CaO, $Fe_2O_3$, $Cr_2O_3$, $MnO_2$, $La_2O_3$, $Y_2O_3$, $Ga_2O_3$ and mixtures thereof; and/or
   less than 4% of a compound selected from the group consisting of the oxides of the elements Sr, Na, K and Ba, and mixtures thereof;
   as weight percentages on the basis of the oxides.

4. The fused grain as claimed in claim 3, comprising:
   less than 40% of titanium oxide $TiO_2$; and/or
   less than 3% of a constituent compound selected from the group consisting of the oxides of the elements Sr, Na, K and Ba, and mixtures thereof;
   as weight percentages on the basis of the oxides.

5. The fused grain as claimed in claim 1, wherein the weight content of MgO is greater than 1.5% and less than 8%, as a weight percentage on the basis of the oxides.

6. The fused grain as claimed in claim 1, wherein the weight content of CaO is greater than 1.5% and less than 8%, as a weight percentage on the basis of the oxides.

7. The fused grain as claimed in claim 1, wherein the weight content of $Y_2O_3$ is greater than 1.5% and less than 8%, as a weight percentage on the basis of the oxides.

8. The fused grain as claimed in claim 1, wherein the content of ($Cr_2O_3+MnO_2+La_2O_3+Ga_2O_3$) is less than 1%, as a weight percentage on the basis of the oxides.

9. The fused grain as claimed in claim 1, wherein the content of the oxides of the elements Sr, Na, K and Ba, and mixtures thereof, is less than 1%, as a weight percentage on the basis of the oxides.

10. The fused grain as claimed in claim 1, wherein the content of silica is greater than 0.1%, as a weight percentage on the basis of the oxides.

11. The fused grain as claimed in claim 10, wherein the content of silica is greater than 1%, as a weight percentage on the basis of the oxides.

12. The fused grain as claimed in claim 1, wherein the content of silica is less than 15%, as a weight percentage on the basis of the oxides.

13. The fused grain as claimed in claim 12 wherein the content of silica is greater than 2% and less than 10%, as a weight percentage on the basis of the oxides.

14. A sintered product obtained by sintering a mixture of powders comprising at least one powder of grains as claimed in claim 1.

* * * * *